P. Salmon,
Gas Apparatus.
Nº 84,967.  Patented Dec. 15, 1868.
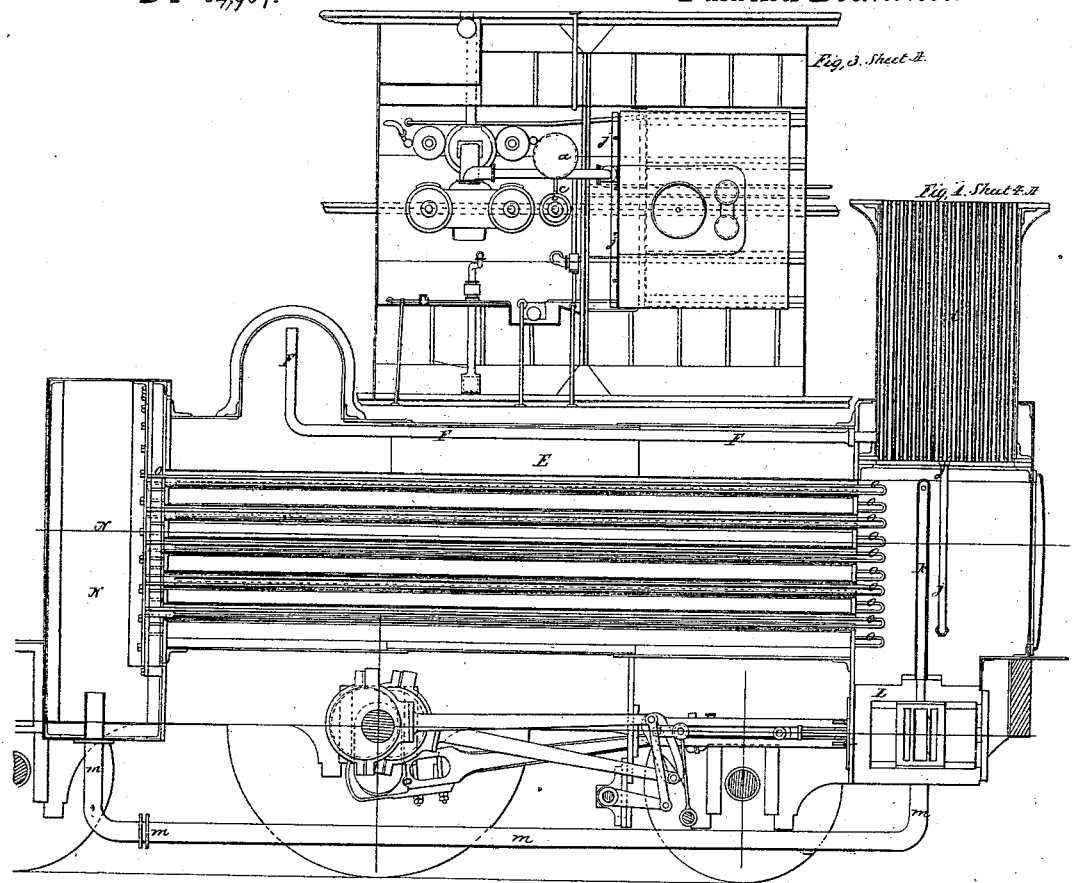
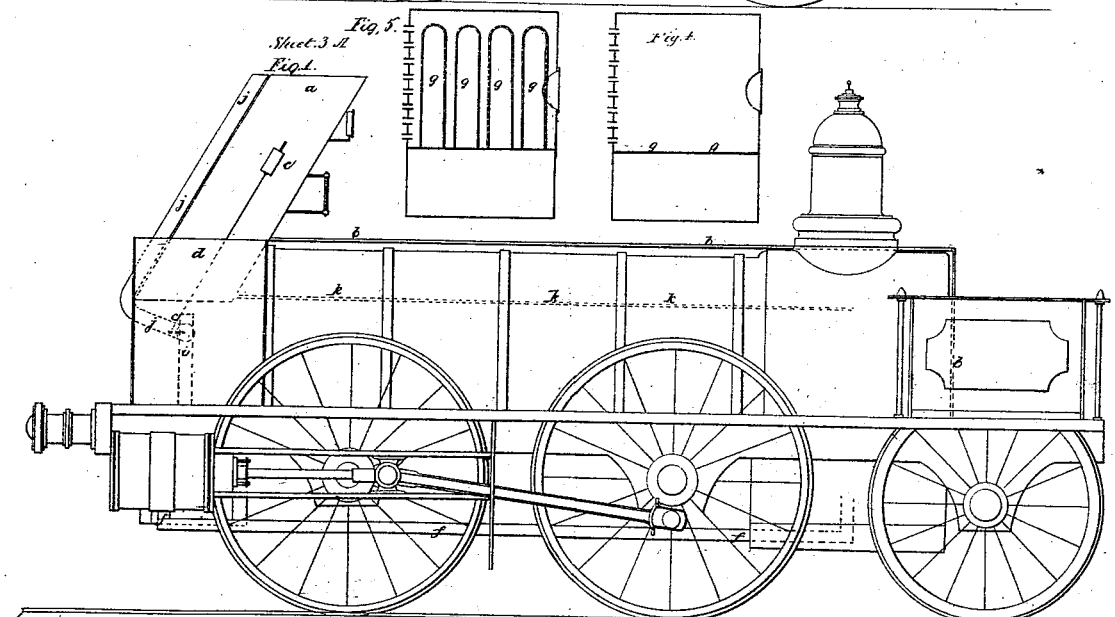

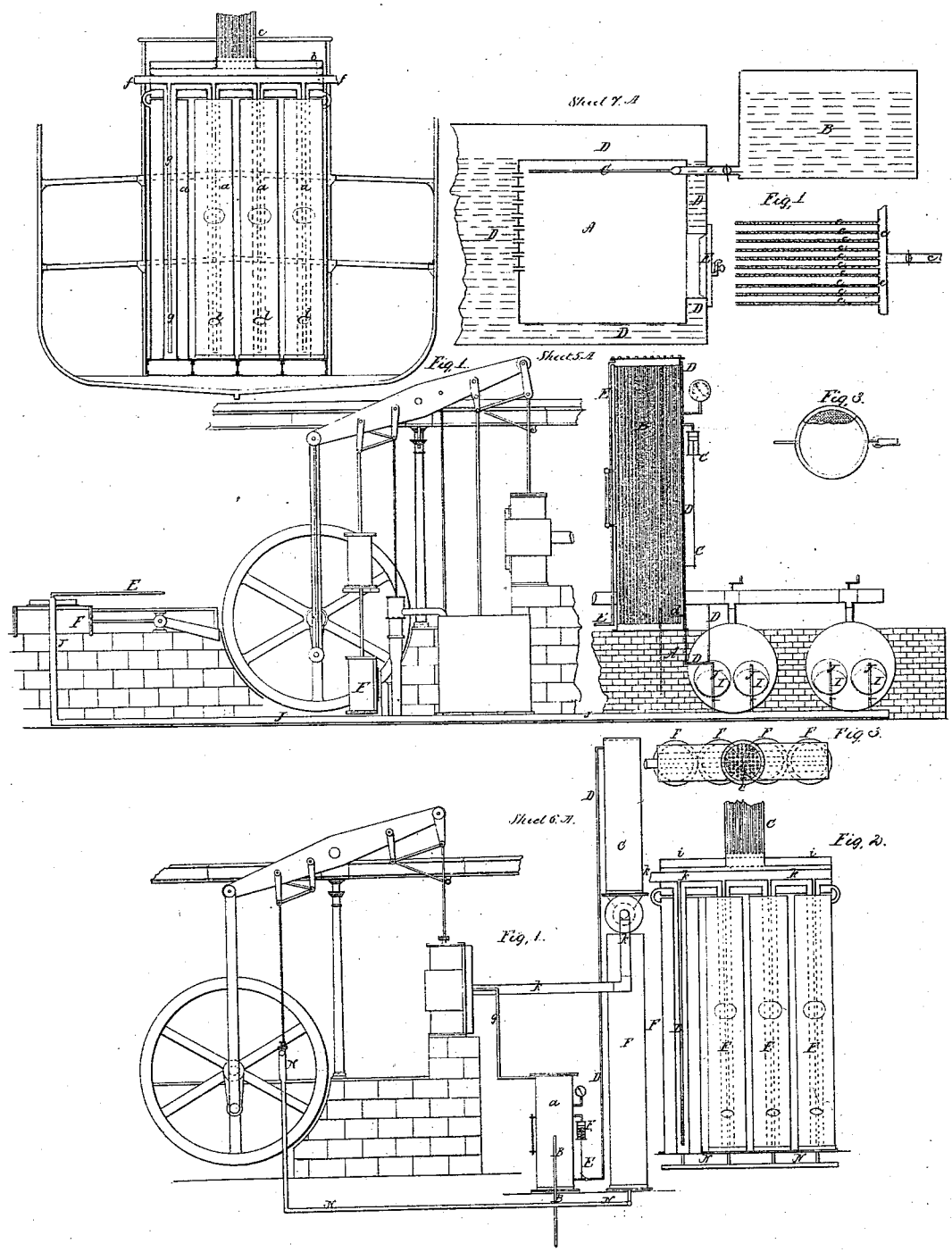

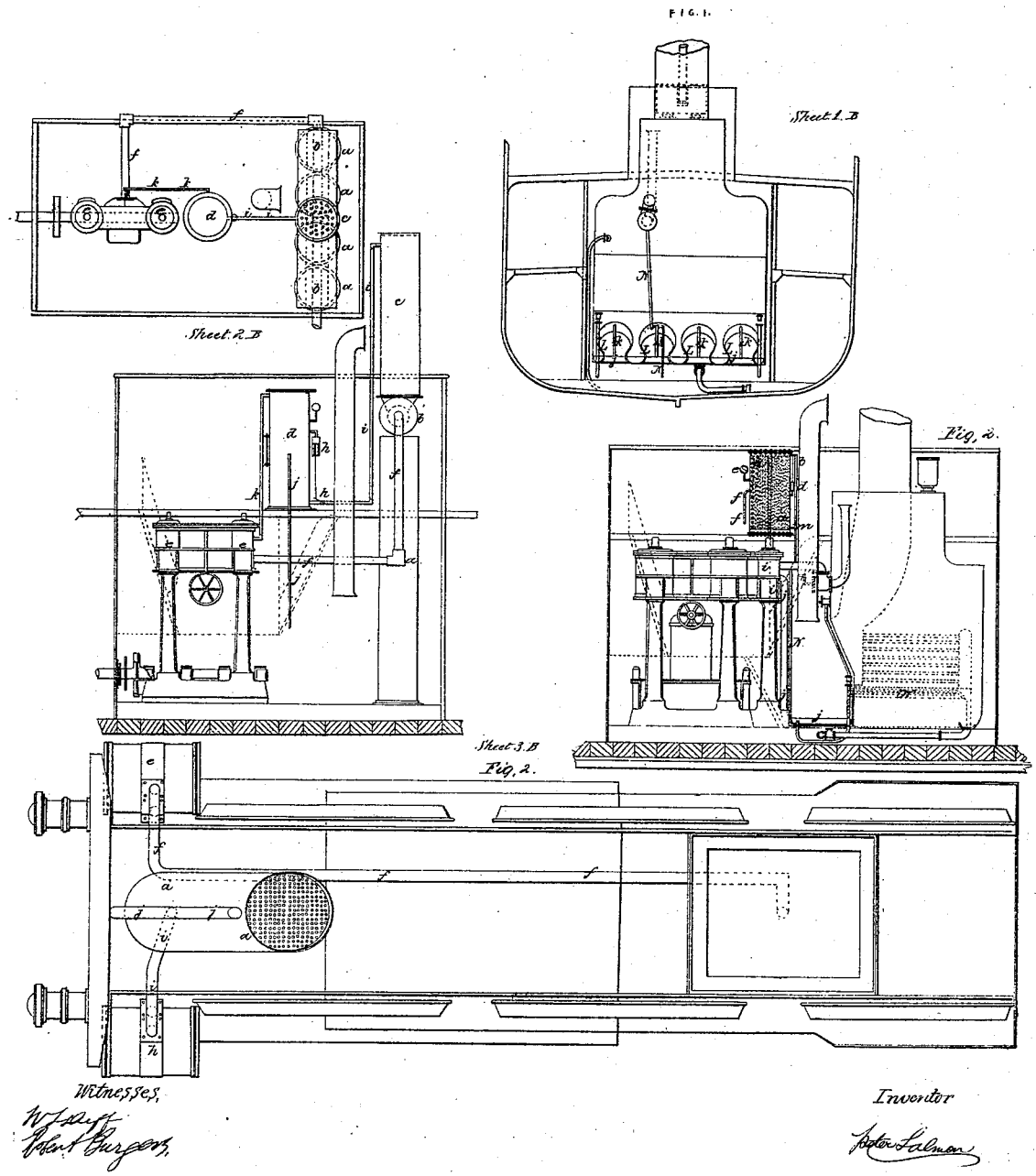

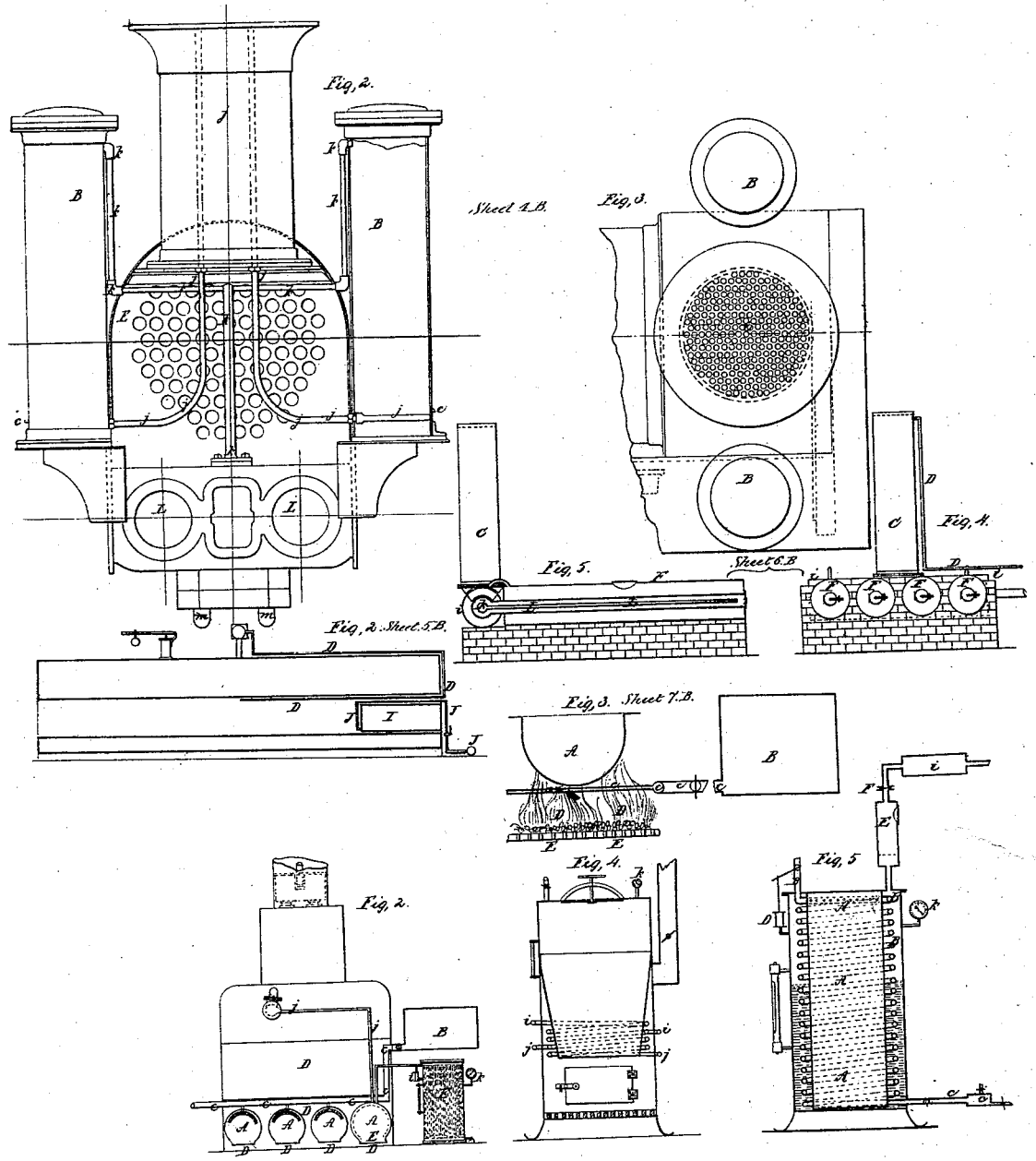

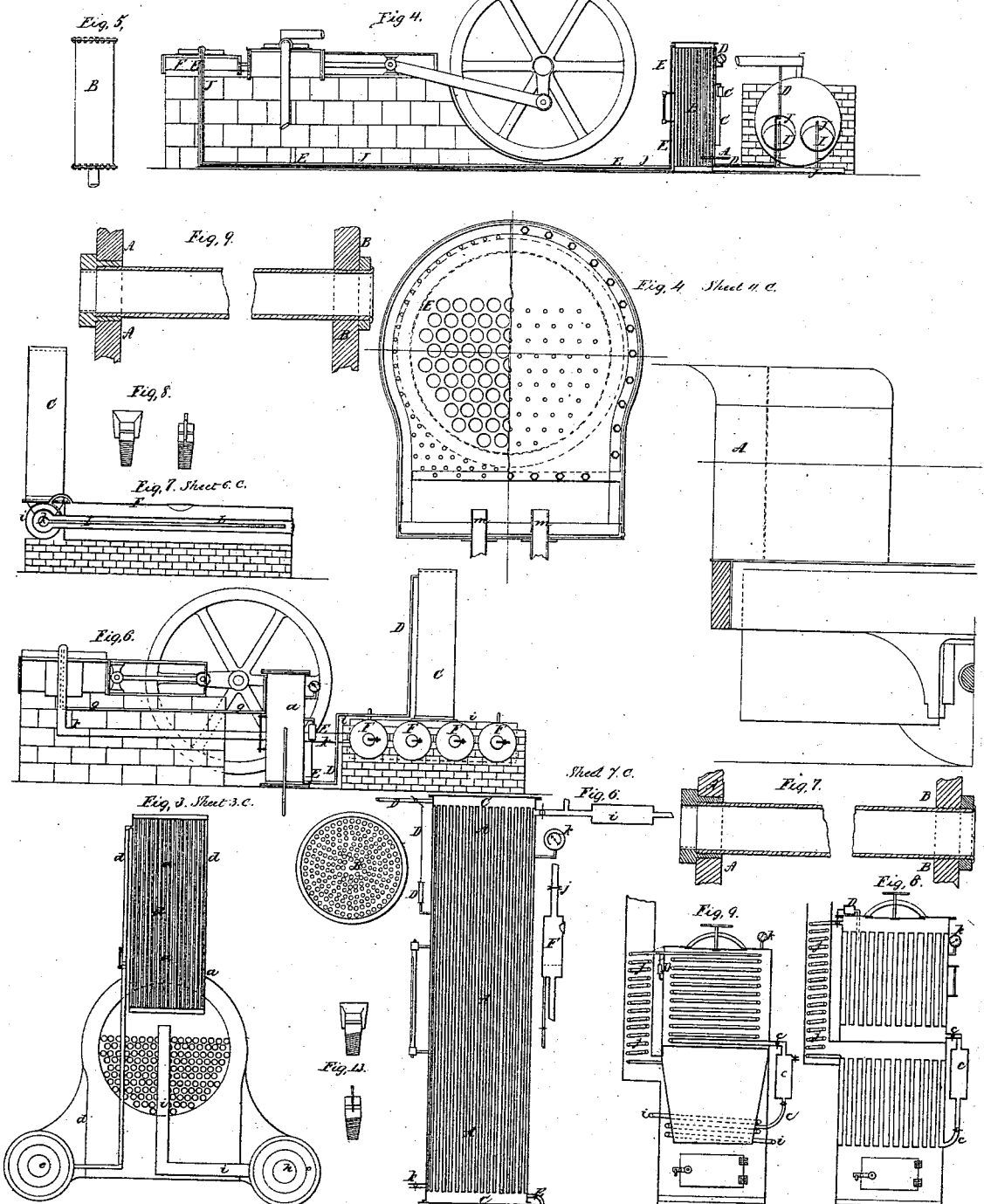

6 Sheets, Sheet 6.
P. Salmon.
Gas Apparatus.
N° 84,967. Patented Dec. 15, 1868.
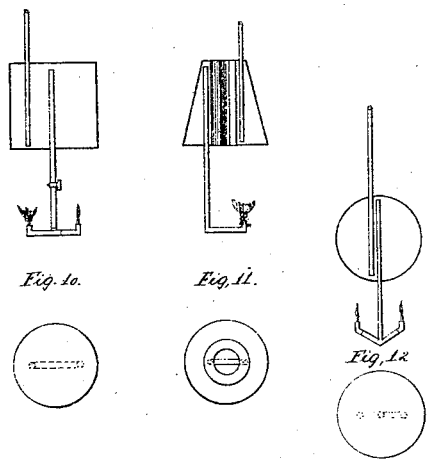
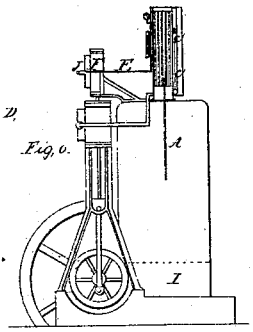
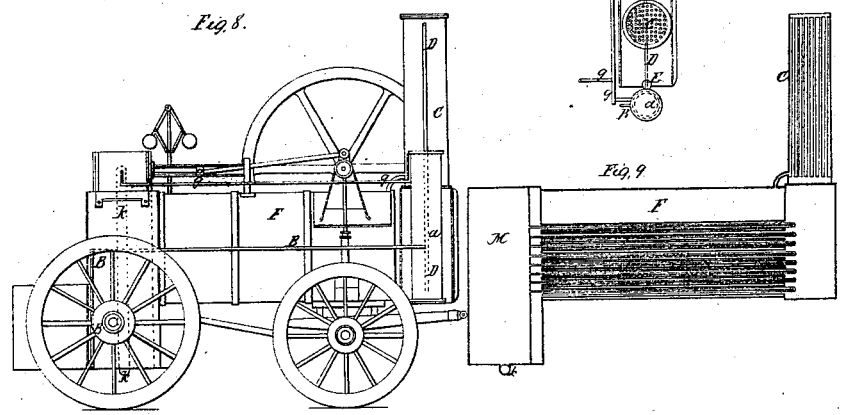
Witnesses,
Inventor
Peter Salmon

UNITED STATES PATENT OFFICE.

PETER SALMON, OF LONDON, ENGLAND.

IMPROVEMENT IN THE MANUFACTURE AND APPLICATION OF GAS FOR VARIOUS USEFUL PURPOSES.

Specification forming part of Letters Patent No. 84,967, dated December 15, 1868.

*To all whom it may concern:*

Be it known that I, PETER SALMON, of London, England, have invented certain improvements in the manufacture of gas and in the treatment and application of such and other gases for cooking, warming, lighting, generating of steam, and other purposes, combined with their use as a motive power previous to their being burned or consumed, and improvements in the apparatus for these purposes; and I do hereby declare that the following is a full and exact description thereof.

My said invention has for its object, among other things, the manufacture or production of gas from spirit, oil, tar, or fatty matters capable of evolving the same, and in the application thereof for heating and lighting purposes, and also as a source of motive power, by means of the apparatus hereinafter described.

In order to obtain gas from any of the above-mentioned substances the same are placed in a closed vessel and heat applied thereto in a direct manner by jets of steam or steam surface-heat, the steam being by preference superheated, or by fire-heat, or by jets of ignited gas or oil, either applied externally to the vessel itself or to coils of pipe or tubes or ducks inserted in the interior thereof. In such last-mentioned case the tubes are fitted in the interior of the vessels or generators, one end thereof being screwed into one tube-plate with back jam-nuts, and the other end thereof being fixed with screwed ferrules into the other tube-plate. Both ends are riveted.

The whole of the apparatus may, if desired, be galvanized, or the surfaces thereof otherwise suitably protected, and may be either combined with a steam-boiler or used separately, and are fitted with self-acting supply and shut-off valves, stop-cocks, pressure and level glass gages, feed-injectors, purifiers, scrubbers, and driers. Such fittings and apparatus, with the exception of the self-acting shut-off valves, scrubbers, and driers hereinafter mentioned, are well known and understood. The said self-acting shut-off valves consist of a barrel or cylinder, by preference formed of brass, and by preference of the dimensions of twelve inches long and one inch diameter, internal measurement.

In the barrel or cylinder is fitted a piston and piston-rod, the former being encircled with an india-rubber ring and the latter passing through the cover of the barrel or cylinder at one end, and the other end thereof diminishing to a quarter of an inch in diameter and provided with a screw-thread for the purpose of screwing it into the gas-generator. The action is effected by the gas entering by this small tube and passing to the under side of the piston, the upper side of the piston being acted on by a circular spiral spring. The piston-rod is thus moved in or out as the pressure of the gas in the generator rises or falls. The piston-rod acts by means of a pivot upon an ordinary stop-cock, and shuts off or opens the passage in the pipes through which the steam passes to generate the gas.

The scrubbers are vessels through which the gas passes, the same being filled with sponge, tanner's bark, asbestus, or charcoal, the liquid therefrom being drawn off by a tube. The driers are also vessels through which the gas passes, and to which heat derived from any convenient source is applied in order to improve the quality of the gas.

The feed-injectors which I prefer to use, although I do not claim the same, are what are commonly known as "Giffard's" injectors, as used in steam-boilers.

My said invention consists in the application of gas manufactured as hereinbefore described, or any other gas for lighting, heating, generating steam, and other purposes, by means of the apparatus and treatment hereinafter described—that is to say, by the heat of ignited gas being applied to the burners, holders, or conveyance-pipes from which the gas is supplied for the purpose of evaporating any liquid contained therein which has been produced by the condensation of the gas, thereby increasing the illuminating, heating, and generating power of the latter. In the use of heat so obtained for generating steam in boilers I employ four different modes or methods of application, which may be applied to boilers or generators of steam of every description, whether locomotive, marine, portable, or stationary. The first of these modes or methods is as follows: The liquid is placed in a cistern, to which a supply-pipe is fitted, and through which the liquid is conveyed to any of the interior parts, surfaces, or tubes of the boiler in drops or in a fine state of division, when it is instantly evaporated into gas by the surface-heat of the steam-boiler, and is then employed in generating steam, a jet or jets of steam (by preference superheated) being, if desired, introduced into the ignited gas to prevent smoke and promote combustion. The second of such modes or methods consists in placing a light fire of coal, charcoal, wood, or other combustible material in the furnace or fire-box, the same being supported by fire-bricks or iron plates, on which the liquid is dropped and thereby evaporated, the gas so produced being employed in generating steam. Jets of steam may be introduced into the ignited gas to prevent smoke and promote combustion. In the third mode or method the liquid is evaporated into gas in a separate closed vessel or generator by fire heat or ignited gas or oil and conveyed through pipes and consumed on the external or internal surface of the boiler itself, or the tubes or coils fitted in the interior thereof, or on a combination of the same, jets of steam (by preference superheated) being mixed with the gas previous to its being burned. In the fourth of such modes or methods the liquid is evaporated into gas in a separate closed vessel or generator by steam surface-heat, (by preference superheated,) either applied to the vessel itself or to coils of pipes or tubes fitted in the interior thereof, jets of steam being mixed with the gas and distributed in the same manner as described with reference to the third mode or method.

The requisite amount of atmospheric air to sustain and promote combustion may either be forced in by force-pumps and tubes or admitted by suitable apertures or perforations.

The gas manufactured or prepared in any of the modes before described in closed vessels (or gas generated or manufactured in any other way, or from other liquids or substances in closed vessels) may be used as a source of motive power, and the elastic or expansive force thereof employed in actuating the pistons of engine-cylinders, or as a substitute for steam, previous to its being burned or consumed for illuminating or heating purposes. The gas may be thus applied to engines of every description, and may be caused to actuate the piston of a separate cylinder in a steam-engine, or to one side only of the piston, the other being actuated by steam.

In all high-pressure engines, whether locomotive, marine, portable, or stationary, the surface-heat of the exhaust-steam (when such steam is first used separately and distinctly from the gas, either by separate cylinders or to one side of the pistons) may be utilized in generating or evaporating the gas by the surface-heat thereof being applied to the gas-generators, as hereinbefore mentioned; but in condensing-engines a jet or jets of steam from the boiler is required to evaporate the gas. When two cylinders are in an engine, as is the case in locomotive-engines, the piston of the one being propelled by gas and the other by steam, the pipes are so arranged that they may supply gas or steam at pleasure; or the one side of each of both pistons may be actuated by gas and the other by steam.

Another mode or method of and apparatus for operating is for the whole of the steam used as a source of motive power to be conveyed by a pipe and passed through the liquid or substance or substances contained in the gas-generator, and then using the gas so produced as a source of motive power previous to its being consumed or burned in raising steam in the boiler or boilers, the heat of the burned gases being applied to a superheater, through which the steam passes before entering the gas-generator; or this mode may be reversed—that is to say, the steam from the boiler may in the first instance be used as a motive power, then superheated and passed through the liquid or substance or substances contained in the generator, thereby producing gas to be consumed in generating the steam in the boiler; but I consider that the former mode will be found preferable, and the duration of the cylinders and pistons increased by the lubricating action of the gas.

I will now proceed to refer to the annexed drawings, from which the nature of my said invention will more fully appear.

Sheets 1 and 1$^A$ show a manner in which old and existing marine engines and boilers can be altered in accordance with my said invention. In Sheet 1, Figure 1 shows a front elevation of boiler with exhaust-gas chambers and connecting-pipes with stop-cocks, and showing the method of superheating the steam. Fig. 2 is a partial longitudinal section, showing the engine and boiler and gas-generator with its appliances, exhaust-gas chambers, and superheating steam-tube. In Sheet 1$^A$, Fig. 3 is a plan view of the engine, boiler, and gas-generator, the same letters of reference being also used in the figures in Sheet 1.

$a\ a$ is the gas-generator; $b$, steam-pipe to generator, with direct branch and stop cock $m$ to oil; $c$, copper tube from gas-generator to high-pressure gas-cylinder; $d$, regulating pressure gas valve apparatus, $e$ indicating the pressure-gage. $ff$ is the oil-supply pipe from tank; $ii$, high-pressure gas-cylinder; $jj$, exhaust-gas pipe with branch and stop-cock $k$ to each gas-chamber L fitted in boiler; N, pipe for superheating the steam for gas-generator. The other parts of these engines and boilers belong to the old and well-understood system of construction, and need not be further described.

The mode of action employed in connection with engines and boilers constructed in accordance with this invention is as follows: In order to start the engine and boiler, a portable steam-boiler with fire-box is requisite to produce gas in the generator $a\ a$, which gas is conveyed by a direct pipe to the exhaust-gas pipe $j\ j$, which conveys the gas by branches $k$ to the back and delivers it into the chambers L, fitted in the boiler. The gas escapes from the chambers for combustion by means of perforations in the tops thereof, or through gas-burners screwed into the chambers, thus raising steam in the boiler, which steam will not only propel the engine, but supplies a small portion from the main pipe by the superheating-pipe N. Such last-mentioned steam passes over the flames of gas above the chamber L, and is then carried to the upper steam-space of the gas-generator $a\,a$, with a direct branch, $m$, to the oil. This superheated steam fills the tubes of the gas-generator, and the oil being outside the tubes, gas is generated by the surface-heat of the said tubes, the condensed water therefrom being drawn off or returned to the boiler from the under steam-space in the generator. The gas from the generator is conveyed from the upper portion thereof by the pipe $c$ to the gas-engine cylinder $i$, and the exhaust-gas from the cylinder is conveyed by the pipe $j$ and the branches $k$ to the chambers L, which are fitted in the boiler, and is there consumed in generating steam, as before described, for propelling condensing-engines.

The before-mentioned gas-engine cylinders may be applied to existing engines, shafts, propellers, or paddles in any other suitable manner—as, for example, on the top of existing cylinders by the rods passing through the latter, or by a separate crank with teeth and pinion to the existing crank-shaft, or in any other suitable position.

The air requisite for combustion is supplied through the space between the top of the gas-chambers and the boiler, or, if preferred, forced into this space by a force-pump.

In Sheets $2^A$ and $2^B$ my said invention is shown as applied to new marine engines and boilers. Fig. 1 in Sheet $2^A$ shows a front elevation and front section of boilers, steam-receiver, and superheater, with the exhaust-gas pipes and branches. Fig. 2 in Sheet $2^B$ is a part longitudinal section, showing the engines, boilers, steam-receiver, superheater, gas-generator, with its appliances, exhaust-gas pipes, and branches in elevation. Fig. 3 in Sheet $2^B$ is a plan of the engines and boilers, steam-receiver, superheater, and gas-generator.

The same letters of reference indicate corresponding parts in all the figures.

$a\,a\,a$ is the boiler; $d$, the gas-generator; $b$, the steam-receiver; $e\,e$, the engine-cylinders; $c$, the superheater; $f\,f$, exhaust-pipe; $g\,g$, branch gas-pipe, perforated at the bottom; $h\,h$, self-acting gas-regulating valve; $i\,i$, steam-pipe from superheater to gas-generator; $j\,j$, oil-supply pipe to gas-generator from oil-tank on which a force-pump or Giffard's injector is fitted; $k\,k$, copper gas-pressure pipe to engine-cylinders; $l\,l\,l$, apertures for lighting the gas.

The mode of action is as follows: To start these new engines, boilers, and other parts when in an unheated state, a portable steam-boiler with fire-box is requisite to produce gas in the generator, from which a direct supply of gas is conveyed by a pipe to the exhaust-pipe $f$, and which gas escapes for combustion by perforations placed at three feet, or thereabout, up from the pipes $g$, thus raising steam in the boilers $a\,a\,a$, which steam passes by connecting-tubes into the receiver $b$, and thence into the superheater C. It is then conveyed by the pipe $i\,i$ to the gas-generator $d$, and there, passing through the oil, forms a highly-combustible gas, which is drawn off by the pipe $k\,k$ to the engine-cylinders $e\,e$. The exhaust-gas from these cylinders is conveyed by the pipe $f$ and branch pipes $g$, and consumed in the under portion of the boilers, as before described.

The engine cylinders may be applied to propellers or paddles in any other suitable manner.

The air required for the puposes of combustion is supplied by the apertures $l\,l\,l$, or forced in by a force-pump at the engine, a connecting-pipe with branches being provided to enable it to enter under each boiler.

Sheet $3^A$, Sheet $3^B$, and Sheet $3^C$ show a method in which old and existing locomotives can be altered in accordance with my invention. Fig. 1 in Sheet $3^A$ is an elevation of a locomotive-engine with gas-generator and appliances thereto, Fig. 2 in Sheet $3^B$ being a plan view of the same. Fig. 3 in Sheet $3^C$ is a transverse section of the front end of the locomotive-boiler, showing the tubes in the gas-generator, Figs. 4 and 5 in Sheet $3^A$ being sections of the fire-box, showing two arrangements, the first of perforated plates and the second of upright perforated tubes, the perforations being provided in each case for the escape of the gas for combustion; or the same may be allowed to escape from the tubes by ordinary gas-burners.

The same letters of reference indicate similar parts in all the figures.

$a$ is the oil-gas generator; $b$, oil-supply tube from tank; $c$, regulating pressure gas valve apparatus; $d$, gas-supply pipe to cylinder; $e$, gas-cylinder; $f$, gas-exhaust pipe; $g$, perforated division-plate in fire-box, Fig. 4, perforated tubes, Fig. 5; $h$, steam-cylinder; $i$, steam-exhaust; $j$, waste-pipe; $k$, superheated-steam tube to gas-generator.

The mode of action is as follows: To start these locomotive-engines when in an unheated state, another locomotive-engine is brought alongside in order to fill the boiler with steam; or a portable steam-boiler, with fire-box placed on the foot-plate, is employed, the same having a connecting-tube to the gas-generator to produce gas, and from which a direct tube is carried to the exhaust-tube $f$, and which conveys the gas to the gas-chamber formed in the under portion of the fire-box, which gas escapes by perforations or by gas-burners screwed into the division-plate or upright tubes for combustion to raise steam in the boiler. The requisite air for the purposes of combustion is admitted by pipes passing through the gas-chamber and delivering the air above the division-plate or by the fire-door. The steam in the boiler propels the piston of the cylinder $h$, the exhaust from which, passing upward by the pipe $i$, combines with the gases passed through the tubes of the gas-generator, thus by their combined surface-heat producing gas from the oil in the generator, and when the gas is too abundant the regulating gas-valve apparatus $e$ sends the exhaust-steam up the waste-pipe $jj$. The gas is conveyed off from the top of the gas-generator to the gas-cylinder by the pipe $d$ $d$, propels the piston therein, and is thence exhausted into the chamber in the under portion of the fire-box by the pipe $f$, and escapes by perforations or by burners screwed into the division-plate, or upright tubes for combustion to raise steam in the boiler; or, in place of taking one of the existing steam-cylinders for conversion into a gas-cylinder, it may be allowed to remain and one or two special gas-cylinders with pistons fitted to any of the unoccupied axles of the locomotive; or they may be applied to the axles of the tender.

Sheet $4^A$, Sheet $4^B$, and Sheet $4^C$ show my said invention as applied to new locomotive engines and boilers. Fig. 1 in Sheet $4^A$ is a longitudinal section of the locomotive engine and boiler, and Fig. 2 in Sheet $4^B$ is a front view of the same. Fig. 3 in Sheet $4^B$ is a plan of the superheater and gas-generators. Fig. 4 in Sheet $4^C$ is a half-section through boiler, gas-distributing plate, and perforations for the admission of air to air-space.

The same letters of reference indicate similar parts in all the last-mentioned sheets.

A is the oil-tank; B B, the oil-gas generators; C C, oil-supply tubes; E, steam-boiler; F, steam-tube to superheater; $i$, steam-superheater; $jj$, steam-tubes from superheater to gas-generators; $k\,k$, gas-tubes from gas-generators to cylinder; L L, gas-cylinders; $m\,m$, gas-exhaust iron pipes; N, gas-chamber; O, gas-pipes.

The mode of action is as follows: To start these locomotives when they are in an unheated condition, another locomotive is brought alongside for the purpose of filling up the boiler with steam, or a portable steam-boiler with fire-box placed on the foot-plate for that purpose, the same being furnished with a connecting-tube to the gas-generators B B, from which a direct tube is taken to the exhaust-tubes $m\,m$, conveying the gas to the chamber N, from which it passes through the pipes O and escapes by perforations on the return length for combustion, thus raising steam in the boiler E, which steam passes to the superheater $i$ by the pipe F. The superheated steam is then conveyed by the pipes $jj$ to the circular tube inside the gas-generators, the same being perforated at the top for the escape of the steam, which passes through the oil and forms a highly-combustible gas on the top of the oil. Such gas is conveyed by the pipes $k\,k$ to the engine-cylinders L L, and after working the pistons therein is exhausted into the chamber N by the pipes $m\,m$, and, passing through the pipes O, inserted in the tubes of the boiler, is burned on the return length therein, as and for the purposes before described. Air is supplied for the purposes of combustion to the air-space. Gas-valve-regulating apparatus, glass level-gage, and indicating pressure-gages are fitted on the gas-generators B B.

Sheet $5^A$, Sheet $5^B$, Sheet $5^C$, and Sheet $5^D$ show a method in which old and existing stationary engines and boilers can be altered in accordance with my said invention. Fig. 1 in Sheet $5^A$ shows an old compound beam-engine and boilers altered in accordance with my said invention. Fig. 2 in Sheet $5^B$ is a longitudinal section of a boiler with exhaust-gas chamber and superheating steam-tube. Fig. 3 in Sheet $5^A$ is a part plan and part section of gas-generator. Fig. 4 in Sheet $5^C$ shows an old horizontal engine and boiler altered in accordance with this invention. Fig. 5 in Sheet $5^C$ is the gas-generator to be acted on by the exhaust-steam in the case of a high-pressure engine. Fig. 6 in Sheet $5^D$ is a steam-crane altered in accordance with my said invention. Fig. 7 in the same sheet is the gas-chamber of the boiler in the steam-crane. Fig. 8 in Sheet $5^C$ is the gas-burner which I propose to use in burning the gas with my apparatus. Fig. 9 in the said last-mentioned sheet shows the method of fixing the tubes in the tube-plates, as hereinbefore particularly described.

In all the figures in Sheet $5^A$, Sheet $5^B$, Sheet $5^C$, and Sheet $5^D$ the same letters of reference indicate similar parts.

A is the oil-supply tube; B, the gas-generator; C, the regulating self-acting gas-valve apparatus; D, superheated-steam tube from steam-pipe to gas-generator. E is the copper pressure gas-tube from gas-generator to gas-cylinder F. J is the exhaust-gas pipe to chambers I in boilers. The other parts of these engines and boilers belong to the old and well-known system of construction, and therefore need not be more particularly described.

The method of action is as follows: To start these altered engines and boilers when the same are in an unheated condition, a small portable steam-boiler with a fire-box is requisite, the same having a connecting steam-tube to the gas-generator B to produce gas, from which a direct gas-pipe conveys the gas to the exhaust-gas pipe $j'$, and, passing through the branch gas-pipes J, enters the gas-chambers I and escapes onto the surface of the chambers by means of perforations, or of gas-burners screwed into the top of the chamber for combustion, thus raising steam in the boilers. Such steam not only propels the old and existing engines, but a small portion thereof is taken off by the superheating-tube D and conveyed to the top steam-space of the gas-generator, and fills all the tubes in the interior thereof. The oil, being outside the tubes, generates gas by its surface-heat, and a branch admits steam to the oil direct. The condensed water is drawn off or returned to the boiler from the under steam-space of the gas-generator. The gas is conveyed from the generator to the gas-engine cylinder F by the copper tube E, and after actuating the pistons therein is exhausted by the pipe and branches J into chambers I, fitted in the steam-boilers, for combustion, as before described. The gas-cylinders F may be placed in any other suitable position for existing engines, or erected separately, if wished. The air requisite for the purposes of combustion in these boilers is either admitted to the space between the top of the chamber and the boiler, or forced therein by a force-pump with a connecting-tube.

Sheet 6$^A$, Sheet 6$^B$, Sheet 6$^C$, and Sheet 6$^D$ show my invention as developed in new stationary engines and boilers, the same being equally applicable to any other construction. Fig. 1 in Sheet 6$^A$ shows a new beam-engine and boilers constructed according to my invention, with steam-receiver, superheater, and gas-generator applied thereto. Figs. 2 and 3 in the same sheet show a front view, partly in section, and a plan of vertical boilers, steam-receiver, and superheater constructed in accordance with my said invention. Figs. 4 and 5 in Sheet 6$^B$ show a longitudinal section of the same. Fig. 6 in Sheet 6$^C$ shows a new horizontal engine and boilers, steam-receiver, and superheater constructed according to my said invention, Fig. 7 in the same sheet being a longitudinal section of the same. Fig. 8 in Sheet 6$^D$ represents a new agricultural and contractor's engine with gas-generators and steam-superheater constructed according to my said invention, Fig. 9 being a part section of the same, and Fig. 10 a plan of the gas-generators and superheater belonging to Fig. 8, the same letters of reference being used for similar parts in the four last-mentioned sheets.

$a$ is the oil-gas generator; B, oil-supply tube from tank, with force-pump or Giffard's injector applied thereto; C, steam-superheater; D, tube from superheater to gas-generator; E, regulating pressure gas valve apparatus; F, steam-boiler; $i$, steam-receiver; $g$, copper pressure gas-tube to cylinders; $k$, exhaust-gas pipes; L, branch gas-pipes, perforated three feet from the lower end; M, gas-chamber; N, air-force pump and air-space with tube to boilers; O, apparatus for lighting the gas or for the admission of air.

The method of action is as follows: To start the engines or boilers when the same are in an unheated condition, a portable steam-boiler with fire-box is required, with a connecting steam-tube to the gas-generator $a$ to produce gas, from which a direct gas-pipe conveys the gas, to the exhaust-gas pipe $k$, and which gas, entering the branch gas-pipes L, escapes for combustion by the perforations or burners which are close set all round the same, extending three feet, or thereabout, from the lower end, thus producing steam in the boilers F, which steam passes into the receiver $i$ by connecting-tubes, and thence into the superheater C. The superheated steam is then conveyed by the pipe D to the bottom of the gas-generator $a$, such pipe being connected with a ring of pipe placed inside the generator, and perforated on the top side for the escape of the steam through the oil, thus forming a highly-combustible gas, which is conveyed by the tube $g$ to the cylinder of the engine, and after propelling the piston therein is exhausted by the pipe $k$ into the branch pipes L for combustion, as before described. The requisite air to sustain and promote combustion is either forced in by the pump N and connecting-tube or admitted by the perforations or apertures O, which perforations or apertures are also for the purpose of lighting the gas.

The figures in Sheets 7$^A$, 7$^B$, 7$^C$, and 7$^D$ show various methods of manufacture or production and burning of gas in accordance with my said invention.

In Fig. 1 in Sheet 7$^A$ A is a fire-box of locomotive-engine; B, oil-tank; C, oil-tube from tank to cross-tube and perforated distribution branch tubes. D is the steam-boiler, and E the fire-door.

In Fig. 2, Sheet 7$^B$, a marine boiler is shown. A, the furnaces; B, oil-tank; C, oil-tube from tank and perforated branch distribution-tubes; D, steam-boiler; E, fire-door; F, gas-regulator; $i$, regulating pressure gas valve apparatus; $j$, superheating steam-coil, (shown in Fig. 4;) $k$, indicating pressure-gage. Fig. 3 in the same sheet shows the application to the coppers used by sugar-refiners or brewers and distillers, and for various manufacturing processes. A is the copper; B, oil-tank; C, perforated tube from tank to cross-tube and branch tube; D D, thin fire of coke, coal, charcoal, or wood; E E, fire-grate. Fig. 4 in the same sheet is an oil-gas apparatus for generating gas by fire heat, or portable steam-boiler. Fig. 5 in the same sheet is an oil-gas apparatus. A is an internal gas-chamber or steam-chest; B, superheated-steam coil of pipe which delivers the steam into the steam-chest, from which the condensed water is drawn off; $c$, condensed-water tube with receptacle and tube to feed-boiler; D, regulating pressure gas valve apparatus; E, scrub-box; F, layers of cloth between flanges; $i$, drier to which fire heat or flames is or are applied.

Fig. 6 in Sheet 7$^C$ is a tubular oil-gas apparatus, A showing a sectional elevation, and B a top section; C, steam-spaces; D, superheated-steam tube with regulating pressure gas valve apparatus applied; E, condensed, water tube; F, scrubber of gas filled with sponge, charcoal, tanner's bark, or asbestus; $i$, drier to which fire heat or flames is or are applied; $j$, layers of cloth between flanges; $k$, oil-supply tube from tank. Fig. 7 in the same sheet shows the manner of fixing the tubes in the top tube-plate, A A, and in the bottom tube-plate, B B. Fig. 8 in the same sheet represents a tubular gas apparatus and tubular steam-boiler combined. Fig. 9 in the same sheet is an oil-gas apparatus and steam-boiler combined.

Figs. 10, 11, and 12 in Sheet 7$^D$ show modes of burning the gas for lighting purposes, and Fig. 13, Sheet 7$^c$, the burners which by preference are employed.

Having thus described and ascertained the nature of my said invention and the manner in which it is to be performed, I would observe in conclusion that what I consider novel and original, and therefore claim, is—

1. The construction and arrangement of gas-generators combined with the before-mentioned self-acting shut-off valves, scrubbers, and driers, and the use of the feed-injectors, substantially as hereinbefore set forth and described, or any mere modifications thereof.

2. The combination and arrangement of apparatus for the application and the methods of treatment of gas for the purposes aforesaid, substantially as hereinbefore set forth and described, or any mere modifications thereof.

PETER SALMON.

Witnesses:
E. P. H. VAUGHAN,
R. S. MORDAUNT VAUGHAN.